Inventors
T. ROBERT BURNIGHT
ROBERT A. EMMETT JR.

By Ralph L. Chappell
Attorney

Patented Nov. 3, 1953

2,658,196

UNITED STATES PATENT OFFICE 2,658,196

SYNCHRONIZING SYSTEM

Thomas Robert Burnight, Washington, D. C., and Robert A. Emmett, Jr., United States Navy Application November 19, 1945, Serial No. 629,687

4 Claims. (Cl. 343—225)

(Granted under Title 35, U. S. Code (1952), sec. 266)

This invention relates to synchronizing systems and, more particularly, to means for synchronizing two switches remotely positioned from each other without the use of any direct connection between the two switches.

In many applications employing multi-channel radio transmitting and receiving apparatus, it is desirable to provide switching means in both the transmitting and receiving units synchronized with each other whereby energization of the channels in the two units is effected in proper time relation. An exemplary application of the instant invention may be found in the radio blind landing system disclosed in copending application No. 629,688, filed November 19, 1945, by T. R. Burnight and R. A. Emmett. The slave switch in the instant system may take the form of an electronic switch, multiple relays, or relay controlled contacts to effect positive switching or time related gating of the channels in the receiving unit.

Accordingly, it is an object of this invention to provide a system for synchronizing a pair of switches without the use of any connecting means therebetween.

Another object of this invention is to provide a system for synchronizing a pair of switches remotely spaced from each other by radio transmitting and receiving means associated with the switches.

Other objects, advantages and capabilities of the invention will become apparent from the following description, taken in conjunction with the accompanying drawings, showing only a preferred embodiment of the invention, in which.

This system is applicable to transmitting and receiving systems of both the continuous wave and pulse types in which intelligence may be radiated from the transmitter, either directionally or non-directionally, alternately in a time sharing fashion. That is, intelligence from two separate sources may be transmitted substantially simultaneously by the transmitting units by coupling the intelligence alternately to the transmitter for short intervals of time. A continuously rotating time sharing switch is coupled to the transmitter to modulate the transmitter alternately at different frequencies. Thus the intelligence from the two sources, if alternately supplied in synchronism with the rotation of the time sharing switch, will have different modulating frequencies associated therewith in the radiation fields of the transmitter. The receiving unit has two frequency sensitive channels coupled to the output of the receiver to separate the intelligence from the two sources by means of their characteristic modulation frequencies, detect the signals, and apply them to a free running multivibrator adjusted to have a free running frequency slightly lower than that of the master switch whereby the signals from the two frequency sensitive channels synchronize the multivibrator with the switching frequency of the transmitting unit. The alternating voltage waveform generated by the free running multivibrator may be shaped as desired by conventional electronic circuits and coupled to slave switching means such as an electronic switch, a pair of solenoid switches, or relay means as desired to effect the switching operation in the receiving unit. This slave switch may function to compare the intelligence from the two sources associated with the transmitting unit in a single channel receiver by alternately switching the input and output of said receiver by gating a pair of measuring circuits, or to alternately couple the received intelligence to visual indicating or audio means to present the intelligence from the two sources as desired in the receiving unit.

Figure 1:
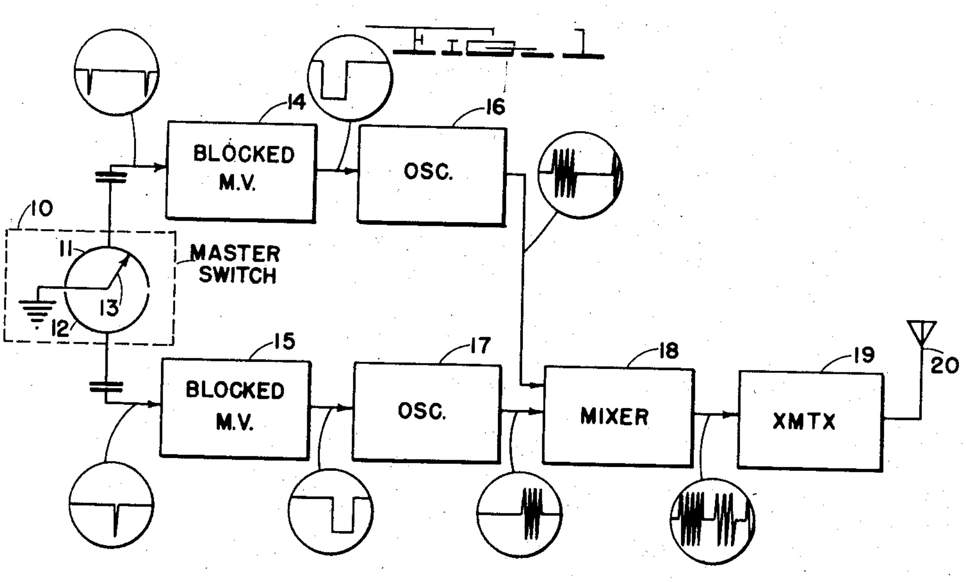
Fig. 1 is a block diagram of the master switch and the associated transmitting means.
Figure 2:
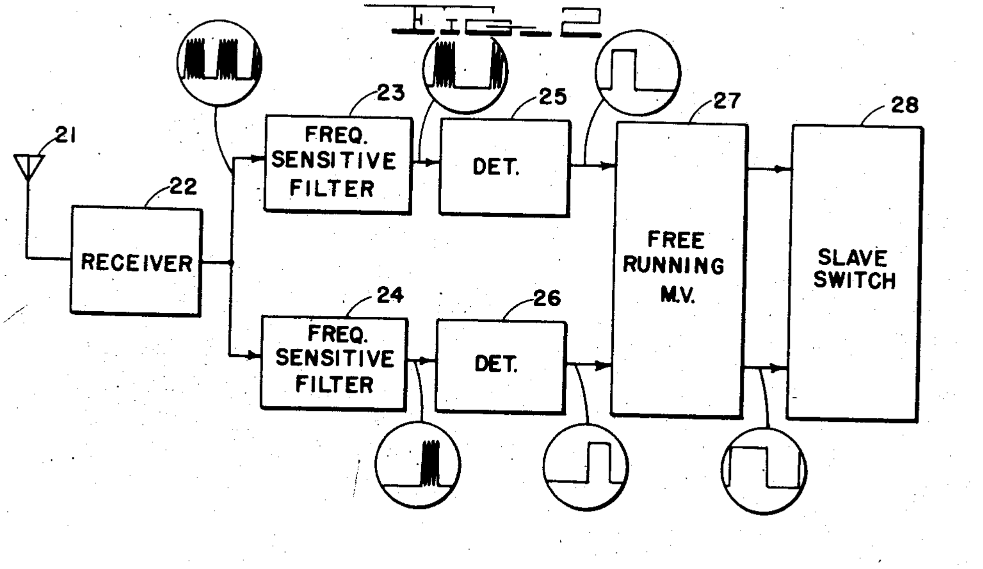
Fig. 2 is a block diagram of the receiving means and the slave switch controlled by the master switch of Fig. 1.

Referring now to Fig. 1, in which is shown the block diagram of the master switch and transmitter unit and the waveforms associated with the various stages, master switch 10 is shown at the left of this figure and consists of two sectors 11 and 12 which are alternately grounded through a continuously rotating switch arm 13. Coupled to the switch sectors 11 and 12 are blocked multivibrators 14 and 15, respectively, adapted to be triggered when the sector to which one of the multivibrators is connected is grounded through the switch arm 13 due to the discharge of condensers between the sectors and the multivibrators. The blocked multivibrators 14 and 15, when triggered, generate a pulse of short duration which unlocks one of the oscillators 16 and 17 coupled to the output thereof. The oscillators 16 and 17 are tuned to generate two distinct frequencies when gated by the output from the blocked multivibrators 14 and 15. The unlocked oscillator runs for the duration of the pulse output from the multivibrator, the output from each oscillator being fed to a mixer 18 where the two outputs are mixed in proper time relation and fed to a transmitter 19 to modulate the transmitter carrier frequency at alternate frequencies for alternate intervals of time.

The intelligence from the two intelligence sources will likewise be coupled into the transmitter to modulate the transmitter in synchronism with the alternating modulation signal frequencies. If it is desired to use a pulse system rather than a continuous wave system, the pulses, bearing a given time relation with the alternations of said master switch, will be coupled from an external modulation generator of any desired form into the mixer 18 to superimpose the alternating oscillations on said pulse to be fed to the transmitter 19. The carrier wave generated by the transmitter 19 and modulated by the switched signal frequencies is radiated into space by means of the antenna 20. This antenna 20 may be either directional or non-directional depending upon the type of intelligence it is desired to transmit therefrom.

The radiations from the transmitter unit comprise a carrier frequency and two side band frequencies determined by the modulation frequency generated in oscillators 16 and 17 and occurring alternately in time in synchronism with the switching of master switch 10 are picked up by the antenna 21 in the receiving unit and fed to a receiver 22. The video output of the receiver 22 comprising the two modulation signals are coupled into a pair of frequency sensitive filters 23 and 24 tuned to the frequencies generated by oscillators 16 and 17 respectively. Here the mixed oscillator frequencies are separated and fed independently to the detectors 25 and 26 having a time constant circuit of proper value by which the pulses of the modulation frequencies generated by the oscillators 16 and 17 are amplified and shaped to form an envelope of the pulses, the leading edge of which is coincident in time with the leading edge of the corresponding pulse of oscillations generated by the oscillators. These triggering pulses are fed to opposite sides of a free running multivibrator 27, this multivibrator 27 being adjusted to run at approximately the same speed as the ground antenna switch 10 so that the synchronizing pulses coupled from the detectors 25 and 26 bring the multivibrator 27 into synchronization with the master switch 10. The output of the free running multivibrator 27 is a waveform of two voltage levels existing alternately for equal time durations, as shown, the leading edge of the higher voltage level portion being coincident in time with the leading edge of the pulse generated by one of the block multivibrators 14, 15 and the leading edge of the lower voltage waveform, and thus the trailing edge of the higher voltage waveform, is coincident in time with the leading edge of the output pulses of the other of the blocking multivibrators 14, 15. This waveform output of the free running multivibrator 27 may be peaked to provide a series of positive and negative pulses synchronized with the master switch 10 for triggering an electronic switch or a double-throw solenoid actuated switch, or the waveform may be coupled to a polarized relay or to a pair of relays arranged to be actuated alternately by an alternating polarity voltage controlled by the positive and negative pulses, thereby alternating the slave switch in synchronism with the master switch 10. It should be noted that the free running multivibrator 27 operates continuously even in the absence of synchronizing signals generated by one of the oscillators 16 and 17. Thus the slave switch 28 is effectively synchronized with the master switch 10 without the use of any direct connection between the two switches, as desired.

Various modifications may be made in the invention without departing from the spirit and scope thereof.

The invention described herein may be manufactured and used by or for the Government of the United States of America without the payment of any royalties thereon or therefor.

What is claimed is:

1. In a switch synchronizing system, the combination of a two position master switching means which is continuously operated between said two positions at a fixed switching rate, transmitter means, transmitter modulator means connected between said switch and said transmitter for alternately modulating said transmitter with either of two frequencies in response to the position of said switching means, receiving means responsive to said transmitter, a pair of frequency selective means coupled to said receiving means for separating the received signals according to said modulation frequencies, a free running multivibrator having a pair of trigger terminals and a pair of output terminals, said trigger terminals being connected to opposite sides of said multivibrator, detector means connecting each of said trigger terminals to a different one of said frequency selective means, said detector producing pulses synchronized with said alternate modulations, the alternation of said multivibrator being controlled by the leading edges of said detector pulses and producing synchronously therewith a square wave across said output terminals, and a slave switching means connected to said output terminals to be operated in response to said square valve.

2. In a switch synchronizing system, the combination of a two position master switching means which is continuously operated between said two positions at a fixed switching rate, transmitter means, a pair of oscillator means connected in parallel between said transmitter and switch for alternately modulating said transmitter at two distinct frequencies in response to the position of said switching means, receiving means responsive to said transmitter, a pair of frequency selective means coupled to said receiving means for separating the received signals according to said modulation frequencies, a multivibrator having a free running frequency slightly lower than that of said master switching means and having a pair of trigger terminals and a pair of output terminals, said trigger terminals being connected to opposite sides of said multivibrator, detector means connecting each of said trigger terminals to a different one of said frequency selective means, said detectors producing pulses synchronized with said alternate modulations, the alternation of said multivibrator being controlled by the leading edges of said detector pulses and producing synchronously therewith a square wave across said output terminals, and a slave switching means connected to said output terminals to be operated in response to said square wave.

3. In a switch synchronizing system, the combination of a two position master switching means which is continuously operated between said two positions at a fixed switching rate, transmitter means, a pair of oscillator means connected to said transmitter for modulating said transmitter and tuned to oscillate at distinct frequencies, control means coupled between said switching means and said oscillator means whereby said oscillators are alternately energized in response to the position of said switching means, receiving means responsive to said transmitter, a pair of frequency selective means coupled to said receiving means for separating the received signals according to said modulation frequencies, a multivibrator having a free running frequency slightly lower than that of said master switching means and having a pair of trigger terminals and a pair of output terminals, said trigger terminals being connected to opposite sides of said multivibrator, detector means connecting each of said trigger terminals to a different one of said frequency selective means, said detectors producing pulses synchronized with said modulations, the alternation of said multivibrator being controlled by the leading edges of said detector pulses and producing synchronously therewith a square wave across said output terminals, and a slave switching means connected to said output terminals to be operated in response to said square wave.

4. In a switch synchronizing system, the combination of a two position master switching means which is continuously operated between said two positions at a fixed switching rate, transmitter means, a pair of oscillator means connected to said transmitter for modulating said transmitter at two distinct frequencies, a pair of pulse producing means alternately triggered by said switching means, each of said pulse producing means being connected to one of said oscillators to produce alternate periods of oscillation from each oscillator of said pair of oscillators, receiving means responsive to said transmitter, a pair of frequency selective means coupled to said receiving means for separating the received signals according to said modulation frequencies, a multivibrator having a free running frequency slightly lower than that of said master switching means and having a pair of trigger terminals and a pair of output terminals, said trigger terminals being connected to opposite sides of said multivibrator, detector means connecting each of said frequency selective means to a different one of said trigger terminals, said detectors producing pulses synchronized with said alternate periods of oscillation, the alternation of said multivibrator being controlled by the leading edges of said detector pulses and producing synchronously therewith a square wave across said output terminals, and slave switching means connected to said output terminals to be operated in response to said square waves.

T. ROBERT BURNIGHT.
ROBERT A. EMMETT, JR.

References Cited in the file of this patent

UNITED STATES PATENTS

| Number | Name | Date |
|---|---|---|
| 1,979,484 | Mathes | Nov. 6, 1934 |
| 2,048,081 | Riggs | July 21, 1936 |
| 2,113,214 | Luck | Apr. 5, 1938 |
| 2,118,917 | Finch | May 31, 1938 |
| 2,189,317 | Koch | Feb. 6, 1940 |
| 2,465,925 | Purington | Mar. 29, 1949 |
| 2,415,929 | Bond | Feb. 18, 1947 |
| 2,452,598 | Page | Nov. 2, 1948 |
| 2,480,338 | Purington | Aug. 30, 1949 |